(12) United States Patent
Siemiet et al.

(10) Patent No.: US 8,674,626 B2
(45) Date of Patent: Mar. 18, 2014

(54) LED LAMP FAILURE ALERTING SYSTEM

(75) Inventors: Dennis Siemiet, Rochester Hills, MI (US); John Ivey, Farmington Hills, MI (US)

(73) Assignee: iLumisys, Inc., Troy, MI (US)

( * ) Notice: Subject to any disclaimer, the term of this patent is extended or adjusted under 35 U.S.C. 154(b) by 637 days.

(21) Appl. No.: 12/202,662

(22) Filed: Sep. 2, 2008

(65) Prior Publication Data

US 2010/0052542 A1    Mar. 4, 2010

(51) Int. Cl.
    *H05B 37/02* (2006.01)
(52) U.S. Cl.
    USPC ............ 315/308; 315/309; 315/291; 315/129
(58) Field of Classification Search
    USPC .......... 315/129, 149, 150, 158, 291, 308, 309
    See application file for complete search history.

(56) References Cited

U.S. PATENT DOCUMENTS

| | | | |
|---|---|---|---|
| 54,511 A | 2/1920 | Owen |
| 58,105 A | 6/1921 | Poritz |
| 79,814 A | 8/1929 | Hoch |
| 80,419 A | 1/1930 | Kramer |
| 84,763 A | 7/1931 | Stange |
| D119,797 S | 4/1940 | Winkler et al. |
| D125,312 S | 2/1941 | Logan |
| 2,909,097 A | 10/1959 | Alden et al. |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |
| 3,612,855 A | 10/1971 | Juhnke |
| 3,643,088 A | 2/1972 | Osteen et al. |

(Continued)

FOREIGN PATENT DOCUMENTS

| | | |
|---|---|---|
| CN | 1584388 A | 2/2005 |
| CN | 2766345 Y | 3/2006 |

(Continued)

OTHER PUBLICATIONS

Written Opinion and International Search Report of the International Search Authority Mar. 22, 2010 from the corresponding International Application No. PCT/US2009/053853 filed Aug. 14, 2009.

(Continued)

*Primary Examiner* — Douglas W Owens
*Assistant Examiner* — Amy Yang
(74) *Attorney, Agent, or Firm* — Young Basile (57) ABSTRACT

Disclosed herein are embodiments of failure alerting systems for LED lamps and LED lamps having the same. An illustrative failure alerting system comprises a photodetector configured to detect an actual light output from the at least one LED, a regulator configured to receive a signal from the photodetector when the actual light output is below a target light output and to increase a current to the at least one LED to maintain the target light output, and a low light output indicator configured to receive a signal from the photodetector when the actual light output remains below the target light output and to produce a low light output signal. A thermal sensor can also be included and configured to sense an operating temperature of the LED and to control the regulator to increase the current and the target light output to ensure the operating temperature does not exceed the target temperature.

28 Claims, 2 Drawing Sheets

(56) References Cited

U.S. PATENT DOCUMENTS

| | | |
|---|---|---|
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,661,890 A | 4/1987 | Watanabe et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,771,274 A | 9/1988 | Havel |
| 4,780,621 A | 10/1988 | Bartleucci et al. |
| 4,794,383 A | 12/1988 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,912,371 A | 3/1990 | Hamilton |
| 4,922,154 A | 5/1990 | Cacoub |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,344,068 A | 9/1994 | Haessig |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |

(56) References Cited

U.S. PATENT DOCUMENTS

| | | |
|---|---|---|
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,465,144 A | 11/1995 | Parker et al. |
| 5,475,300 A | 12/1995 | Havel |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,513,082 A | 4/1996 | Asano |
| 5,519,496 A | 5/1996 | Borgert et al. |
| 5,530,322 A | 6/1996 | Ference et al. |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,640,061 A | 6/1997 | Bornhorst et al. |
| 5,640,141 A | 6/1997 | Myllymaki |
| 5,642,129 A | 6/1997 | Zavracky et al. |
| 5,655,830 A | 8/1997 | Ruskouski |
| 5,656,935 A | 8/1997 | Havel |
| 5,661,645 A | 8/1997 | Hochstein |
| 5,673,059 A | 9/1997 | Zavracky et al. |
| 5,682,103 A | 10/1997 | Burrell |
| 5,688,042 A | 11/1997 | Madadi et al. |
| 5,697,695 A | 12/1997 | Lin et al. |
| 5,701,058 A | 12/1997 | Roth |
| 5,712,650 A | 1/1998 | Barlow |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,784,006 A | 7/1998 | Hochstein |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |
| 5,836,676 A | 11/1998 | Ando et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| 5,854,542 A | 12/1998 | Forbes |
| RE36,030 E | 1/1999 | Nadeau |
| 5,859,508 A | 1/1999 | Ge et al. |
| 5,865,529 A | 2/1999 | Yan |
| 5,890,794 A | 4/1999 | Abtahi et al. |
| 5,896,010 A | 4/1999 | Mikolajczak et al. |
| 5,907,742 A | 5/1999 | Johnson et al. |
| 5,912,653 A | 6/1999 | Fitch |
| 5,917,534 A * | 6/1999 | Rajeswaran ................ 347/238 |
| 5,921,660 A | 7/1999 | Yu |
| 5,924,784 A | 7/1999 | Chliwnyj et al. |
| 5,927,845 A | 7/1999 | Gustafson et al. |
| 5,946,209 A | 8/1999 | Eckel et al. |
| 5,949,347 A | 9/1999 | Wu |
| 5,952,680 A | 9/1999 | Strite |
| 5,959,547 A | 9/1999 | Tubel et al. |
| 5,962,989 A | 10/1999 | Baker |
| 5,962,992 A | 10/1999 | Huang et al. |
| 5,963,185 A | 10/1999 | Havel |
| 5,974,553 A | 10/1999 | Gandar |
| 5,980,064 A | 11/1999 | Metroyanis |
| 5,998,928 A | 12/1999 | Hipp |
| 6,007,209 A | 12/1999 | Pelka |
| 6,008,783 A | 12/1999 | Kitagawa et al. |
| 6,011,691 A | 1/2000 | Schreffler |
| 6,016,038 A | 1/2000 | Mueller et al. |
| 6,018,237 A | 1/2000 | Havel |
| 6,020,825 A | 2/2000 | Chansky et al. |
| 6,025,550 A | 2/2000 | Kato |
| 6,028,694 A | 2/2000 | Schmidt |
| 6,030,099 A | 2/2000 | McDermott |
| 6,031,343 A | 2/2000 | Recknagel et al. |
| D422,737 S | 4/2000 | Orozco |
| 6,056,420 A | 5/2000 | Wilson et al. |
| 6,068,383 A | 5/2000 | Robertson et al. |
| 6,069,597 A | 5/2000 | Hansen |
| 6,072,280 A | 6/2000 | Allen |
| 6,084,359 A | 7/2000 | Hetzel et al. |
| 6,091,200 A | 7/2000 | Lenz |
| 6,092,915 A | 7/2000 | Rensch |
| 6,095,661 A | 8/2000 | Lebens et al. |
| 6,097,352 A | 8/2000 | Zavracky et al. |
| 6,121,875 A | 9/2000 | Hamm et al. |
| 6,127,783 A | 10/2000 | Pashley et al. |
| 6,132,072 A | 10/2000 | Turnbull et al. |
| 6,135,604 A | 10/2000 | Lin |
| 6,139,174 A | 10/2000 | Butterworth |
| 6,149,283 A | 11/2000 | Conway et al. |
| 6,150,774 A | 11/2000 | Mueller et al. |
| 6,151,529 A | 11/2000 | Batko |
| 6,158,882 A | 12/2000 | Bischoff, Jr. |
| 6,166,496 A | 12/2000 | Lys et al. |
| 6,175,201 B1 | 1/2001 | Sid |
| 6,175,220 B1 | 1/2001 | Billig et al. |
| 6,181,126 B1 | 1/2001 | Havel |
| 6,183,086 B1 | 2/2001 | Neubert |
| 6,183,104 B1 | 2/2001 | Ferrara |
| 6,184,628 B1 | 2/2001 | Ruthenberg |
| 6,196,471 B1 | 3/2001 | Ruthenberg |
| 6,211,626 B1 | 4/2001 | Lys et al. |
| 6,215,409 B1 | 4/2001 | Blach |
| 6,217,190 B1 | 4/2001 | Altman et al. |
| 6,219,239 B1 | 4/2001 | Mellberg et al. |
| 6,227,679 B1 | 5/2001 | Zhang et al. |
| 6,238,075 B1 | 5/2001 | Dealey, Jr. et al. |
| 6,241,359 B1 | 6/2001 | Lin |
| 6,250,774 B1 | 6/2001 | Begemann et al. |
| 6,252,350 B1 | 6/2001 | Alvarez |
| 6,252,358 B1 | 6/2001 | Xydis et al. |
| 6,268,600 B1 | 7/2001 | Nakamura et al. |
| 6,273,338 B1 | 8/2001 | White |
| 6,275,397 B1 | 8/2001 | McClain |
| 6,283,612 B1 | 9/2001 | Hunter |
| 6,292,901 B1 | 9/2001 | Lys et al. |
| 6,293,684 B1 | 9/2001 | Riblett |
| 6,297,724 B1 | 10/2001 | Bryans et al. |
| 6,305,109 B1 | 10/2001 | Lee |

(56) References Cited

U.S. PATENT DOCUMENTS

| | | | |
|---|---|---|---|
| 6,305,821 B1 | 10/2001 | Hsieh et al. | |
| 6,307,331 B1 | 10/2001 | Bonasia et al. | |
| 6,310,590 B1 | 10/2001 | Havel | |
| 6,323,832 B1 | 11/2001 | Nishizawa et al. | |
| 6,325,651 B1 | 12/2001 | Nishihara et al. | |
| 6,334,699 B1 | 1/2002 | Gladnick | |
| 6,340,868 B1 | 1/2002 | Lys et al. | |
| 6,354,714 B1 | 3/2002 | Rhodes | |
| 6,361,186 B1 | 3/2002 | Slayden | |
| 6,369,525 B1 | 4/2002 | Chang et al. | |
| 6,371,637 B1 | 4/2002 | Atchinson et al. | |
| 6,379,022 B1 | 4/2002 | Amerson et al. | |
| D457,667 S | 5/2002 | Piepgras et al. | |
| D457,669 S | 5/2002 | Piepgras et al. | |
| D457,974 S | 5/2002 | Piepgras et al. | |
| 6,394,623 B1 | 5/2002 | Tsui | |
| 6,396,216 B1 * | 5/2002 | Noone et al. | 315/119 |
| D458,395 S | 6/2002 | Piepgras et al. | |
| 6,400,096 B1 | 6/2002 | Wells et al. | |
| 6,404,131 B1 | 6/2002 | Kawano et al. | |
| 6,411,022 B1 | 6/2002 | Machida | |
| 6,422,716 B2 | 7/2002 | Henrici et al. | |
| 6,428,189 B1 | 8/2002 | Hochstein | |
| D463,610 S | 9/2002 | Piepgras et al. | |
| 6,445,139 B1 | 9/2002 | Marshall et al. | |
| 6,448,550 B1 | 9/2002 | Nishimura | |
| 6,448,716 B1 | 9/2002 | Hutchison | |
| 6,459,919 B1 | 10/2002 | Lys et al. | |
| 6,469,457 B2 | 10/2002 | Callahan | |
| 6,471,388 B1 | 10/2002 | Marsh | |
| 6,472,823 B2 | 10/2002 | Yen | |
| 6,473,002 B1 | 10/2002 | Hutchison | |
| D468,035 S | 12/2002 | Blanc et al. | |
| 6,488,392 B1 | 12/2002 | Lu | |
| 6,495,964 B1 | 12/2002 | Muthu et al. | |
| 6,521,879 B1 * | 2/2003 | Rand et al. | 250/205 |
| 6,527,411 B1 | 3/2003 | Sayers | |
| 6,528,954 B1 | 3/2003 | Lys et al. | |
| 6,528,958 B2 | 3/2003 | Hulshof et al. | |
| 6,538,375 B1 | 3/2003 | Duggal et al. | |
| 6,548,967 B1 | 4/2003 | Dowling et al. | |
| 6,573,536 B1 | 6/2003 | Dry | |
| 6,577,072 B2 | 6/2003 | Saito et al. | |
| 6,577,080 B2 | 6/2003 | Lys et al. | |
| 6,577,512 B2 | 6/2003 | Tripathi et al. | |
| 6,577,794 B1 | 6/2003 | Currie et al. | |
| 6,578,979 B2 | 6/2003 | Truttmann-Battig | |
| 6,582,103 B1 | 6/2003 | Popovich et al. | |
| 6,583,550 B2 | 6/2003 | Iwasa et al. | |
| 6,583,573 B2 | 6/2003 | Bierman | |
| 6,586,890 B2 | 7/2003 | Min et al. | |
| 6,592,238 B2 | 7/2003 | Cleaver et al. | |
| 6,596,977 B2 | 7/2003 | Muthu et al. | |
| 6,598,996 B1 | 7/2003 | Lodhie | |
| 6,608,453 B2 | 8/2003 | Morgan et al. | |
| 6,608,614 B1 | 8/2003 | Johnson | |
| 6,609,804 B2 | 8/2003 | Nolan et al. | |
| 6,612,712 B2 | 9/2003 | Nepil | |
| 6,612,717 B2 | 9/2003 | Yen | |
| 6,621,222 B1 | 9/2003 | Hong | |
| 6,623,151 B2 | 9/2003 | Pederson | |
| 6,624,597 B2 | 9/2003 | Dowling et al. | |
| D481,484 S | 10/2003 | Cuevas et al. | |
| 6,634,770 B2 | 10/2003 | Cao | |
| 6,634,779 B2 | 10/2003 | Reed | |
| 6,636,003 B2 | 10/2003 | Rahm et al. | |
| 6,639,349 B1 | 10/2003 | Bahadur | |
| 6,641,284 B2 | 11/2003 | Stopa et al. | |
| 6,659,622 B2 | 12/2003 | Katogi et al. | |
| 6,660,935 B2 | 12/2003 | Southard et al. | |
| 6,666,689 B1 | 12/2003 | Savage, Jr. | |
| 6,667,623 B2 * | 12/2003 | Bourgault et al. | 324/414 |
| 6,674,096 B2 | 1/2004 | Sommers | |
| 6,676,284 B1 | 1/2004 | Wynne Willson | |
| 6,679,621 B2 | 1/2004 | West et al. | |
| 6,681,154 B2 | 1/2004 | Nierlich et al. | |
| 6,682,205 B2 | 1/2004 | Lin | |
| 6,683,419 B2 | 1/2004 | Kriparos | |
| 6,700,136 B2 | 3/2004 | Guida | |
| 6,712,486 B1 | 3/2004 | Popovich et al. | |
| 6,717,376 B2 | 4/2004 | Lys et al. | |
| 6,717,526 B2 | 4/2004 | Martineau et al. | |
| 6,720,745 B2 | 4/2004 | Lys et al. | |
| 6,726,348 B2 | 4/2004 | Gloisten | |
| 6,741,324 B1 | 5/2004 | Kim | |
| D491,678 S | 6/2004 | Piepgras | |
| D492,042 S | 6/2004 | Piepgras | |
| 6,744,223 B2 | 6/2004 | Laflamme et al. | |
| 6,748,299 B1 | 6/2004 | Motoyama | |
| 6,762,562 B2 | 7/2004 | Leong | |
| 6,774,584 B2 | 8/2004 | Lys et al. | |
| 6,777,891 B2 | 8/2004 | Lys et al. | |
| 6,781,329 B2 | 8/2004 | Mueller et al. | |
| 6,787,999 B2 | 9/2004 | Stimac et al. | |
| 6,788,000 B2 | 9/2004 | Appelberg et al. | |
| 6,788,011 B2 | 9/2004 | Mueller et al. | |
| 6,791,840 B2 | 9/2004 | Chun | |
| 6,801,003 B2 | 10/2004 | Schanberger et al. | |
| 6,806,659 B1 | 10/2004 | Mueller et al. | |
| 6,814,470 B2 | 11/2004 | Rizkin et al. | |
| 6,815,724 B2 | 11/2004 | Dry | |
| 6,846,094 B2 | 1/2005 | Luk | |
| 6,851,816 B2 | 2/2005 | Wu et al. | |
| 6,851,832 B2 | 2/2005 | Tieszen | |
| 6,853,151 B2 | 2/2005 | Leong et al. | |
| 6,853,563 B1 | 2/2005 | Yang et al. | |
| 6,857,924 B2 | 2/2005 | Fu et al. | |
| 6,860,628 B2 | 3/2005 | Robertson et al. | |
| 6,866,401 B2 | 3/2005 | Sommers et al. | |
| 6,869,204 B2 | 3/2005 | Morgan et al. | |
| 6,871,981 B2 | 3/2005 | Alexanderson et al. | |
| 6,874,924 B1 | 4/2005 | Hulse et al. | |
| 6,879,883 B1 | 4/2005 | Motoyama | |
| 6,882,111 B2 | 4/2005 | Kan et al. | |
| 6,883,929 B2 | 4/2005 | Dowling | |
| 6,883,934 B2 | 4/2005 | Kawakami et al. | |
| 6,888,322 B2 | 5/2005 | Dowling et al. | |
| 6,897,624 B2 | 5/2005 | Lys et al. | |
| 6,909,239 B2 | 6/2005 | Gauna | |
| 6,909,921 B1 | 6/2005 | Bilger | |
| 6,918,680 B2 | 7/2005 | Seeberger | |
| 6,921,181 B2 | 7/2005 | Yen | |
| 6,936,968 B2 | 8/2005 | Cross et al. | |
| 6,936,978 B2 | 8/2005 | Morgan et al. | |
| 6,940,230 B2 | 9/2005 | Myron et al. | |
| 6,948,829 B2 | 9/2005 | Verdes et al. | |
| 6,964,501 B2 | 11/2005 | Ryan | |
| 6,965,197 B2 | 11/2005 | Tyan et al. | |
| 6,965,205 B2 | 11/2005 | Piepgras et al. | |
| 6,967,448 B2 | 11/2005 | Morgan et al. | |
| 6,969,179 B2 | 11/2005 | Sloan et al. | |
| 6,969,186 B2 | 11/2005 | Sonderegger et al. | |
| 6,969,954 B2 | 11/2005 | Lys | |
| 6,975,079 B2 | 12/2005 | Lys et al. | |
| 6,979,097 B2 | 12/2005 | Elam et al. | |
| 6,982,518 B2 | 1/2006 | Chou et al. | |
| 6,995,681 B2 | 2/2006 | Pederson | |
| 6,997,576 B1 | 2/2006 | Lodhie et al. | |
| 7,004,603 B2 | 2/2006 | Knight | |
| D518,218 S | 3/2006 | Roberge et al. | |
| 7,008,079 B2 | 3/2006 | Smith | |
| 7,014,336 B1 | 3/2006 | Ducharme et al. | |
| 7,015,650 B2 | 3/2006 | McGrath | |
| 7,018,063 B2 | 3/2006 | Michael et al. | |
| 7,021,799 B2 | 4/2006 | Mizuyoshi | |
| 7,021,809 B2 | 4/2006 | Iwasa et al. | |
| 7,024,256 B2 | 4/2006 | Krzyzanowski et al. | |
| 7,031,920 B2 | 4/2006 | Dowling et al. | |
| 7,033,036 B2 | 4/2006 | Pederson | |
| 7,038,398 B1 | 5/2006 | Lys et al. | |
| 7,038,399 B2 | 5/2006 | Lys et al. | |
| 7,042,172 B2 | 5/2006 | Dowling et al. | |
| 7,048,423 B2 | 5/2006 | Stepanenko et al. | |
| 7,049,761 B2 | 5/2006 | Timmermans et al. | |

(56) References Cited

U.S. PATENT DOCUMENTS

| | | |
|---|---|---|
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 | 6/2006 | Leong et al. |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |
| 7,088,904 B2 | 8/2006 | Ryan, Jr. |
| 7,102,902 B1 | 9/2006 | Brown et al. |
| 7,113,541 B1 | 9/2006 | Lys et al. |
| 7,114,830 B2 * | 10/2006 | Robertson et al. ............ 362/240 |
| 7,114,834 B2 | 10/2006 | Rivas et al. |
| 7,118,262 B2 | 10/2006 | Negley |
| 7,119,503 B2 | 10/2006 | Kemper |
| 7,120,560 B2 * | 10/2006 | Williams et al. .............. 702/188 |
| 7,121,679 B2 | 10/2006 | Fujimoto |
| 7,122,976 B1 | 10/2006 | Null et al. |
| 7,128,442 B2 | 10/2006 | Lee et al. |
| 7,128,454 B2 | 10/2006 | Kim et al. |
| D532,532 S | 11/2006 | Maxik |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,144,135 B2 | 12/2006 | Martin et al. |
| 7,153,002 B2 | 12/2006 | Kim et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,164,110 B2 | 1/2007 | Pitigoi-Aron et al. |
| 7,165,863 B1 | 1/2007 | Thomas et al. |
| 7,165,866 B2 | 1/2007 | Li |
| 7,167,777 B2 | 1/2007 | Budike, Jr. |
| 7,168,843 B2 | 1/2007 | Striebel |
| D536,468 S | 2/2007 | Crosby |
| 7,178,941 B2 | 2/2007 | Roberge et al. |
| 7,180,252 B2 | 2/2007 | Lys et al. |
| D538,950 S | 3/2007 | Maxik |
| D538,952 S | 3/2007 | Maxik et al. |
| D538,962 S | 3/2007 | Elliott |
| 7,186,003 B2 | 3/2007 | Dowling et al. |
| 7,186,005 B2 | 3/2007 | Hulse |
| 7,187,141 B2 | 3/2007 | Mueller et al. |
| 7,190,126 B1 | 3/2007 | Paton |
| 7,192,154 B2 | 3/2007 | Becker |
| 7,201,491 B2 | 4/2007 | Bayat et al. |
| 7,201,497 B2 | 4/2007 | Weaver, Jr. et al. |
| 7,202,613 B2 | 4/2007 | Morgan et al. |
| 7,204,615 B2 | 4/2007 | Arik et al. |
| 7,204,622 B2 | 4/2007 | Dowling et al. |
| 7,207,696 B1 | 4/2007 | Lin |
| 7,210,818 B2 | 5/2007 | Luk et al. |
| 7,210,957 B2 | 5/2007 | Mrakovich et al. |
| 7,211,959 B1 | 5/2007 | Chou |
| 7,213,934 B2 | 5/2007 | Zarian et al. |
| 7,217,012 B2 | 5/2007 | Southard et al. |
| 7,217,022 B2 | 5/2007 | Ruffin |
| 7,218,056 B1 | 5/2007 | Harwood |
| 7,218,238 B2 | 5/2007 | Right et al. |
| 7,220,015 B2 | 5/2007 | Dowling |
| 7,221,104 B2 | 5/2007 | Lys et al. |
| 7,221,110 B2 | 5/2007 | Sears et al. |
| 7,224,000 B2 | 5/2007 | Aanegola et al. |
| 7,226,189 B2 | 6/2007 | Lee et al. |
| 7,228,052 B1 | 6/2007 | Lin |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,237,924 B2 | 7/2007 | Martineau et al. |
| 7,237,925 B2 | 7/2007 | Mayer et al. |
| 7,239,532 B1 | 7/2007 | Hsu et al. |
| 7,241,038 B2 | 7/2007 | Naniwa et al. |
| 7,242,152 B2 | 7/2007 | Dowling et al. |
| 7,246,926 B2 | 7/2007 | Harwood |
| 7,246,931 B2 | 7/2007 | Hsieh et al. |
| 7,248,239 B2 | 7/2007 | Dowling et al. |
| 7,249,269 B1 | 7/2007 | Motoyama |
| 7,249,865 B2 | 7/2007 | Robertson |
| D548,868 S | 8/2007 | Roberge et al. |
| 7,252,408 B2 | 8/2007 | Mazzochette et al. |
| 7,253,566 B2 | 8/2007 | Lys et al. |
| 7,255,457 B2 | 8/2007 | Ducharme et al. |
| 7,255,460 B2 | 8/2007 | Lee |
| 7,256,554 B2 | 8/2007 | Lys |
| 7,258,458 B2 | 8/2007 | Mochiachvili et al. |
| 7,258,467 B2 | 8/2007 | Saccomanno et al. |
| 7,259,528 B2 | 8/2007 | Pilz |
| 7,262,439 B2 | 8/2007 | Setlur et al. |
| 7,264,372 B2 | 9/2007 | Maglica |
| 7,267,467 B2 | 9/2007 | Wu et al. |
| 7,270,443 B2 | 9/2007 | Kurtz et al. |
| 7,271,794 B1 | 9/2007 | Cheng et al. |
| 7,273,300 B2 | 9/2007 | Mrakovich |
| 7,274,045 B2 | 9/2007 | Chandran et al. |
| 7,274,160 B2 | 9/2007 | Mueller et al. |
| D553,267 S | 10/2007 | Yuen |
| 7,285,801 B2 | 10/2007 | Eliashevich et al. |
| 7,288,902 B1 | 10/2007 | Melanson |
| 7,296,912 B2 | 11/2007 | Beauchamp |
| 7,300,184 B2 | 11/2007 | Ichikawa et al. |
| 7,300,192 B2 | 11/2007 | Mueller et al. |
| D556,937 S | 12/2007 | Ly |
| D557,854 S | 12/2007 | Lewis |
| 7,303,300 B2 | 12/2007 | Dowling et al. |
| 7,306,353 B2 | 12/2007 | Popovich et al. |
| 7,307,391 B2 | 12/2007 | Shan |
| 7,308,296 B2 | 12/2007 | Lys et al. |
| 7,309,965 B2 | 12/2007 | Dowling et al. |
| 7,318,658 B2 | 1/2008 | Wang et al. |
| 7,319,244 B2 | 1/2008 | Liu et al. |
| 7,319,246 B2 | 1/2008 | Soules et al. |
| 7,321,191 B2 | 1/2008 | Setlur et al. |
| 7,326,964 B2 | 2/2008 | Lim et al. |
| 7,329,031 B2 | 2/2008 | Liaw et al. |
| D563,589 S | 3/2008 | Hariri et al. |
| 7,345,320 B2 | 3/2008 | Dahm |
| 7,348,604 B2 | 3/2008 | Matheson |
| 7,350,936 B2 | 4/2008 | Ducharme et al. |
| 7,350,952 B2 | 4/2008 | Nishigaki |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,358,929 B2 | 4/2008 | Mueller et al. |
| 7,374,327 B2 | 5/2008 | Schexnaider |
| 7,385,359 B2 | 6/2008 | Dowling et al. |
| 7,391,159 B2 | 6/2008 | Harwood |
| 7,396,146 B2 | 7/2008 | Wang |
| 7,401,935 B2 | 7/2008 | VanderSchuit |
| 7,401,945 B2 | 7/2008 | Zhang |
| 7,427,840 B2 | 9/2008 | Morgan et al. |
| 7,429,117 B2 | 9/2008 | Pohlert et al. |
| 7,434,964 B1 | 10/2008 | Zheng et al. |
| 7,438,441 B2 | 10/2008 | Sun et al. |
| D580,089 S | 11/2008 | Ly et al. |
| D581,556 S | 11/2008 | To et al. |
| 7,449,847 B2 | 11/2008 | Schanberger et al. |
| D582,577 S | 12/2008 | Yuen |
| D584,428 S | 1/2009 | Li et al. |
| 7,476,004 B2 | 1/2009 | Chan |
| 7,478,924 B2 | 1/2009 | Robertson |
| D586,484 S | 2/2009 | Liu et al. |
| D586,928 S | 2/2009 | Liu et al. |
| 7,490,957 B2 | 2/2009 | Leong et al. |
| 7,497,596 B2 | 3/2009 | Ge |
| 7,507,001 B2 | 3/2009 | Kit |
| 7,510,299 B2 | 3/2009 | Timmermans et al. |
| 7,521,872 B2 | 4/2009 | Bruning |
| 7,524,089 B2 | 4/2009 | Park |

(56) References Cited

U.S. PATENT DOCUMENTS

| | | |
|---|---|---|
| D593,223 S | 5/2009 | Komar |
| 7,534,002 B2 | 5/2009 | Yamaguchi et al. |
| 7,549,769 B2 | 6/2009 | Kim et al. |
| 7,556,396 B2 | 7/2009 | Kuo et al. |
| 7,572,030 B2 | 8/2009 | Booth et al. |
| 7,575,339 B2 | 8/2009 | Hung |
| 7,619,366 B2 | 11/2009 | Diederiks |
| 7,635,201 B2 | 12/2009 | Deng |
| D612,528 S | 3/2010 | McGrath et al. |
| 7,690,813 B2 | 4/2010 | Kanamori et al. |
| 7,710,253 B1 * | 5/2010 | Fredricks ............... 340/464 |
| 2001/0033488 A1 | 10/2001 | Chliwnyj et al. |
| 2001/0045803 A1 | 11/2001 | Cencur |
| 2002/0038157 A1 | 3/2002 | Dowling et al. |
| 2002/0044066 A1 | 4/2002 | Dowling et al. |
| 2002/0047569 A1 | 4/2002 | Dowling et al. |
| 2002/0047624 A1 | 4/2002 | Stam et al. |
| 2002/0047628 A1 | 4/2002 | Morgan et al. |
| 2002/0048169 A1 | 4/2002 | Dowling et al. |
| 2002/0057061 A1 | 5/2002 | Mueller et al. |
| 2002/0060526 A1 | 5/2002 | Timmermans et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0152298 A1 | 10/2002 | Kikta et al. |
| 2002/0153851 A1 | 10/2002 | Morgan et al. |
| 2002/0158583 A1 | 10/2002 | Lys et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176259 A1 | 11/2002 | Ducharme |
| 2002/0179816 A1 | 12/2002 | Haines et al. |
| 2002/0195975 A1 | 12/2002 | Schanberger et al. |
| 2003/0011538 A1 | 1/2003 | Lys et al. |
| 2003/0028260 A1 | 2/2003 | Blackwell |
| 2003/0031015 A1 | 2/2003 | Ishibashi |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0085710 A1 | 5/2003 | Bourgault et al. |
| 2003/0095404 A1 | 5/2003 | Becks et al. |
| 2003/0100837 A1 | 5/2003 | Lys et al. |
| 2003/0102810 A1 | 6/2003 | Cross et al. |
| 2003/0133292 A1 | 7/2003 | Mueller et al. |
| 2003/0137258 A1 | 7/2003 | Piepgras et al. |
| 2003/0185005 A1 | 10/2003 | Sommers et al. |
| 2003/0185014 A1 | 10/2003 | Gloisten |
| 2003/0189412 A1 | 10/2003 | Cunningham |
| 2003/0222587 A1 | 12/2003 | Dowling, Jr. et al. |
| 2003/0234342 A1 * | 12/2003 | Gaines et al. ............... 250/205 |
| 2004/0003545 A1 | 1/2004 | Gillespie |
| 2004/0012959 A1 | 1/2004 | Robertson et al. |
| 2004/0036006 A1 | 2/2004 | Dowling |
| 2004/0037088 A1 | 2/2004 | English et al. |
| 2004/0052076 A1 | 3/2004 | Mueller et al. |
| 2004/0062041 A1 | 4/2004 | Cross et al. |
| 2004/0075572 A1 | 4/2004 | Buschmann et al. |
| 2004/0080960 A1 | 4/2004 | Wu |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0113568 A1 | 6/2004 | Dowling et al. |
| 2004/0116039 A1 | 6/2004 | Mueller et al. |
| 2004/0124782 A1 | 7/2004 | Yu |
| 2004/0130909 A1 | 7/2004 | Mueller et al. |
| 2004/0141321 A1 | 7/2004 | Dowling et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0189218 A1 | 9/2004 | Leong et al. |
| 2004/0189262 A1 | 9/2004 | McGrath |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0223328 A1 | 11/2004 | Lee et al. |
| 2004/0240890 A1 | 12/2004 | Lys et al. |
| 2004/0257007 A1 | 12/2004 | Lys et al. |
| 2005/0013133 A1 | 1/2005 | Yeh |
| 2005/0024877 A1 | 2/2005 | Frederick |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0043907 A1 | 2/2005 | Eckel et al. |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0078477 A1 | 4/2005 | Lo |
| 2005/0099824 A1 | 5/2005 | Dowling et al. |
| 2005/0107694 A1 | 5/2005 | Jansen et al. |
| 2005/0110384 A1 | 5/2005 | Peterson |
| 2005/0116667 A1 | 6/2005 | Mueller et al. |
| 2005/0128751 A1 | 6/2005 | Roberge et al. |
| 2005/0141225 A1 | 6/2005 | Striebel |
| 2005/0151489 A1 | 7/2005 | Lys et al. |
| 2005/0151663 A1 | 7/2005 | Tanguay |
| 2005/0154494 A1 | 7/2005 | Ahmed |
| 2005/0174473 A1 | 8/2005 | Morgan et al. |
| 2005/0174780 A1 | 8/2005 | Park |
| 2005/0184667 A1 | 8/2005 | Sturman et al. |
| 2005/0201112 A1 | 9/2005 | Machi et al. |
| 2005/0206529 A1 * | 9/2005 | St.-Germain ............ 340/815.45 |
| 2005/0213320 A1 | 9/2005 | Kazuhiro et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219860 A1 | 10/2005 | Schexnaider |
| 2005/0219872 A1 | 10/2005 | Lys |
| 2005/0225979 A1 | 10/2005 | Robertson et al. |
| 2005/0231133 A1 | 10/2005 | Lys |
| 2005/0236029 A1 | 10/2005 | Dowling |
| 2005/0236998 A1 | 10/2005 | Mueller et al. |
| 2005/0248299 A1 | 11/2005 | Chemel et al. |
| 2005/0253533 A1 | 11/2005 | Lys et al. |
| 2005/0259424 A1 | 11/2005 | Zampini, II et al. |
| 2005/0265019 A1 | 12/2005 | Sommers et al. |
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0050509 A9 | 3/2006 | Dowling et al. |
| 2006/0050514 A1 | 3/2006 | Opolka |
| 2006/0076908 A1 | 4/2006 | Morgan et al. |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0132061 A1 | 6/2006 | McCormick et al. |

(56) References Cited

U.S. PATENT DOCUMENTS

| | | |
|---|---|---|
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0197661 A1 | 9/2006 | Tracy et al. |
| 2006/0198128 A1 | 9/2006 | Piepgras et al. |
| 2006/0208667 A1 | 9/2006 | Lys et al. |
| 2006/0221606 A1 | 10/2006 | Dowling et al. |
| 2006/0221619 A1 | 10/2006 | Nishigaki |
| 2006/0232974 A1 | 10/2006 | Lee et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0064419 A1 | 3/2007 | Gandhi |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0115658 A1 | 5/2007 | Mueller et al. |
| 2007/0115665 A1 | 5/2007 | Mueller et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0147046 A1 | 6/2007 | Arik et al. |
| 2007/0152797 A1 | 7/2007 | Chemel et al. |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0200725 A1* | 8/2007 | Fredericks et al. ...... 340/815.45 |
| 2007/0205712 A1 | 9/2007 | Radkov et al. |
| 2007/0206375 A1 | 9/2007 | Piepgras et al. |
| 2007/0211463 A1* | 9/2007 | Chevalier et al. ............ 362/249 |
| 2007/0228999 A1* | 10/2007 | Kit ................................ 315/291 |
| 2007/0235751 A1 | 10/2007 | Radkov et al. |
| 2007/0236156 A1 | 10/2007 | Lys et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247842 A1 | 10/2007 | Zampini et al. |
| 2007/0247847 A1 | 10/2007 | Villard |
| 2007/0247851 A1 | 10/2007 | Villard |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0037245 A1 | 2/2008 | Chan |
| 2008/0037284 A1 | 2/2008 | Rudisill |
| 2008/0049434 A1* | 2/2008 | Marsh ........................... 362/377 |
| 2008/0062680 A1 | 3/2008 | Timmermans et al. |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094837 A1 | 4/2008 | Dobbins et al. |
| 2008/0130267 A1 | 6/2008 | Dowling et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0186704 A1 | 8/2008 | Chou et al. |
| 2008/0192436 A1 | 8/2008 | Peng et al. |
| 2008/0211419 A1 | 9/2008 | Garrity |
| 2008/0224629 A1 | 9/2008 | Melanson |
| 2008/0224636 A1 | 9/2008 | Melanson |
| 2008/0253125 A1 | 10/2008 | Kang et al. |
| 2008/0258647 A1 | 10/2008 | Scianna |
| 2008/0285257 A1 | 11/2008 | King |
| 2008/0290814 A1 | 11/2008 | Leong et al. |
| 2008/0291675 A1 | 11/2008 | Lin et al. |
| 2008/0315784 A1 | 12/2008 | Tseng |
| 2009/0002995 A1 | 1/2009 | Lee et al. |
| 2009/0016063 A1 | 1/2009 | Hu |
| 2009/0046473 A1 | 2/2009 | Tsai et al. |
| 2009/0052186 A1 | 2/2009 | Xue |
| 2009/0067182 A1 | 3/2009 | Hsu et al. |
| 2009/0086492 A1 | 4/2009 | Meyer |
| 2009/0091938 A1 | 4/2009 | Jacobson et al. |
| 2009/0175041 A1 | 7/2009 | Yuen et al. |
| 2009/0185373 A1 | 7/2009 | Grajcar |
| 2009/0195186 A1 | 8/2009 | Guest et al. |
| 2009/0196034 A1 | 8/2009 | Gherardini et al. |
| 2009/0213588 A1 | 8/2009 | Manes |
| 2009/0273926 A1 | 11/2009 | Deng |
| 2009/0303720 A1 | 12/2009 | McGrath |
| 2009/0316408 A1 | 12/2009 | Villard |
| 2010/0027259 A1 | 2/2010 | Simon et al. |
| 2010/0033964 A1 | 2/2010 | Choi et al. |

FOREIGN PATENT DOCUMENTS

| | | |
|---|---|---|
| CN | 2869556 Y | 2/2007 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 A2 | 1/1995 |
| EP | 0432848 B1 | 4/1995 |
| EP | 0403001 B1 | 8/1995 |
| EP | 0525876 B1 | 5/1996 |
| EP | 0714556 B1 | 1/1999 |
| EP | 0458408 B1 | 9/1999 |

(56) References Cited

FOREIGN PATENT DOCUMENTS

| | | |
|---|---|---|
| EP | 0578302 B1 | 9/1999 |
| EP | 0723701 B1 | 1/2000 |
| EP | 0787419 B1 | 5/2001 |
| EP | 1195740 A2 | 4/2002 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1142452 B1 | 3/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 B1 | 6/2007 |
| EP | 0922305 B1 | 8/2007 |
| EP | 0922306 B1 | 8/2007 |
| EP | 1194918 B1 | 8/2007 |
| EP | 1048085 B1 | 11/2007 |
| EP | 1763650 B1 | 12/2007 |
| EP | 1776722 B1 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1337784 B1 | 6/2009 |
| JP | 6-54103 U | 7/1994 |
| JP | H6-54103 | 7/1994 |
| JP | 7-249467 | 9/1995 |
| JP | 08-162677 | 6/1996 |
| JP | 11-135274 A | 5/1999 |
| JP | 2001-238272 A | 8/2001 |
| JP | 2002-141555 A | 5/2002 |
| JP | 3098271 U | 2/2004 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006-507641 A | 3/2006 |
| JP | 3139714 U | 2/2008 |
| KR | 10-2004-0008244 A | 1/2004 |
| KR | 20-0430022 Y1 | 11/2006 |
| KR | 10-0781652 B1 | 12/2007 |
| TW | M337036 | 7/2008 |
| WO | 99/10867 A1 | 3/1999 |
| WO | 99/31560 A2 | 6/1999 |
| WO | 00/01067 A2 | 1/2000 |
| WO | 02/25842 A2 | 3/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/099780 A2 | 12/2002 |
| WO | 03/026358 A1 | 3/2003 |
| WO | 03/055273 A2 | 7/2003 |
| WO | 03/067934 A2 | 8/2003 |
| WO | 03/090890 A1 | 11/2003 |
| WO | 03/096761 A1 | 11/2003 |
| WO | 2004/021747 A2 | 3/2004 |
| WO | 2004/023850 A2 | 3/2004 |
| WO | 2004/032572 A2 | 4/2004 |
| WO | 2004/100624 A2 | 11/2004 |
| WO | 2005/052751 A2 | 6/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 2006/023149 A2 | 3/2006 |
| WO | 2006/093889 A2 | 9/2006 |
| WO | 2006/127666 A2 | 11/2006 |
| WO | 2006/127785 A2 | 11/2006 |
| WO | 2006/133272 A2 | 12/2006 |
| WO | 2007/081674 A1 | 7/2007 |
| WO | 2007/094810 A2 | 8/2007 |

OTHER PUBLICATIONS

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.

Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.

Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.

Telecite Products & Services—Display Options, [online], [retrieved on Jan. 13, 2000] Retrieved from Telecite Web page using Internet <URL: http://www.telecite.com/en/products/options en.htm>.

Traffic Signal Products—Transportation Products Group, [online], [retrieved on Jan. 13, 2000] Retrieved from the Dialight Web Page using Internet <URL: http://www.dialight.com/trans.htm>.

LED Lights, Replacement LED lamps for any incandescent light, [online], [retrieved on Jan. 13, 2000] Retrieved from LED Lights Web Page using Internet <URL: http://www.ledlights.com/replac.htm>.

Ledtronics, Ledtronics Catalog, 1996, p. 10, Ledtronics, Torrance, California.

Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.

Phason Electronic Control Systems, Light Level Controller (LLC) case study. Nov. 30, 2004. 3 pages, Phason Inc., Winnipeg, Manitoba, Canada.

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.

Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_1000000000000056772>.

(56) References Cited

OTHER PUBLICATIONS

Sensor Switch, nLight Lighting Control System, [online], [retrieved on Jan. 11, 2008] Retrieved from Sensor Switch web page using Internet <URL: http://www.sensorswitch.com>.

Six Strategies, [online], [retrieved on Jan. 11, 2008] Retrieved from Encelium Technologies Inc. Web Page using Internet <URL: http://www.encelium.com/products/strategies.html>.

Lawrence Berkeley National Laboratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.

Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module. html?b=offices&m+Central HVAC Systems&s=Contr . . . >.

Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.

D.N.A-III [online], [retrieved Mar. 10, 2009] Retrieved from the PLC Lighting Web Page using Internet <URL: http://www.plclighting.com/product_info.php?cPath=1&products_id=92>.

E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.

E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.

E20112-22 Starburst Collection, [online], [retrieved on Jul. 10, 2010] Retrieved from ET2 Contemporary Lighting using Internet <URL: http://www.etonline.com/proddetail.apx?ItemID=E20112-22>.

E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.

E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.

\* cited by examiner

LED LAMP FAILURE ALERTING SYSTEM

FIELD OF THE INVENTION

The present invention relates in general to light fixtures utilizing light-emitting diodes, and more particularly, to failure alerting systems for the light emitting diodes.

BACKGROUND

Light emitting diode (LED) lighting fixtures are useful for a variety of applications. Examples of these applications include commercial and household interior lighting, exterior and egress lighting, emergency lighting, automotive lighting and instrument lighting. LED lighting fixtures promise to provide improvements over existing lighting technologies. One significant improvement is a longer operating life. This improvement, however, raises different challenges than other lighting technology. Whereas other sources of light, such as fluorescent and incandescent, have a failure mode of relatively sudden and complete shut-off, LEDs typically continue to fade over time without shutting off completely. This tendency has been recognized by the solid-state lighting industry in the form of lifetime measurement criteria that defines LED life as "L70", the hours of service at which the LED will output 70% of its original and/or rated output at the original/rated power draw.

This failure mode can be perceived as a benefit, for example in the case of an LED lamp used to light an entrance over a dark set of stairs. An incandescent light will fail immediately when the filament burns out, leaving the entrance and stairs in the dark, while an LED lamp will typically continue to provide light at some level for a much longer period of time. However, the gradual dimming can be problematic. For example, at a given power draw, less light is output, resulting in an area that is less lit than intended. This can result in safety or security problems. More lights must be turned on or the lamps must be "undimmed" in order for the light levels to reach the level desired. The result is increased power consumption. Egress lighting requirements may require lighting designers to over-specify the amount of light in an area to ensure the required emergency egress light level is available in emergency evacuations over the lifetime of a building. This can cause regulatory barriers to the acceptance and implementation of LEDs into commercial and institutional buildings. In addition, due to the difficulty, time and expense of accurately determining when an LED light has permanently dropped below the acceptable light output limit, consumers may automatically replace LEDs upon expiration of the warranty. This may result in years of useful operational life being unnecessarily wasted, reducing the cost effectiveness of using LED lighting in the first place.

BRIEF SUMMARY

Disclosed herein are embodiments of LED lamps with failure alerting systems. On such illustrative embodiment of an LED lamp with failure alerting system comprises an LED lighting unit comprising at least one LED and a circuit board, a photodetector configured to detect an actual light output from at least one LED, a regulator configured to receive a signal from the photodetector when the actual light output is below a target light output and to increase a current to the at least one LED to maintain the target light output, a thermal sensor configured to sense an operating temperature of the at least one LED, wherein the regulator is further configured to receive a thermal signal from the thermal sensor and to maintain the current and the target light output such that the operating temperature does not exceed a target temperature, and a low light output indicator configured to receive a signal from the photodetector when the actual light output remains below the target light output and to produce a low light output signal.

Another embodiment disclosed here is of a failure alerting system for use with LED lighting fixtures having at least one LED. The illustrative failure alerting system comprises a photodetector configured to detect an actual light output from the at least one LED, a regulator configured to receive a signal from the photodetector when the actual light output is below a target light output and to increase a current to the at least one LED to maintain the target light output, a thermal sensor configured to sense an operating temperature of the at least one LED and to control the regulator to increase the current and the target light output to ensure the operating temperature does not exceed a target temperature, and a low light output indicator configured to receive a signal from the photodetector when the actual light output remains below the target light output and to produce a low light output signal.

Yet another embodiment of a failure alerting system for use with LED lighting fixtures having at least one LED is disclosed herein. The illustrative failure alerting system comprises a photodetector configured to detect an actual light output from the at least one LED, a regulator configured to receive a signal from the photodetector when the actual light output is below a target light output and to increase a current to the at least one LED to maintain the target light output, and a low light output indicator configured to receive a signal from the photodetector when the actual light output remains below the target light output and to produce a low light output signal.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
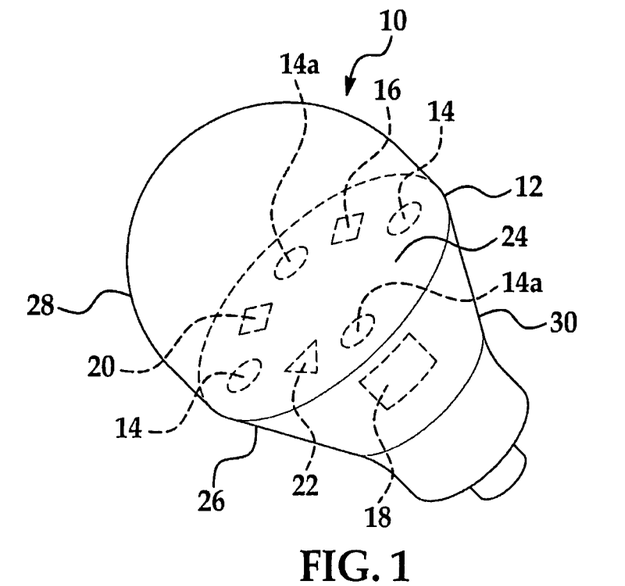
FIG. 1 is a perspective view of an embodiment of an LED lamp with failure alerting system disclosed herein.

FIG. 1 illustrates one embodiment of an LED lamp 10 with a failure alerting system. The lamp 10 comprises an LED lighting unit 12 comprising at least one LED 14, a photodetector 16, a regulator 18, a thermal sensor 20, and a low light output indicator 22.

In this illustrative embodiment, the photodetector 16 is configured to detect an actual light output from at least one LED 14. The regulator 18 receives a signal from the photodetector 16 when the actual light output is below a target light output. When the signal is received, the regulator 18 increases a current to the one or more LEDs to maintain the target light output. The thermal sensor 20 senses an operating temperature of the at least one LED and controls the regulator 18 to increase the current and the target light output to ensure the operating temperature does not exceed a target temperature. In other words, the regulator 18 receives a thermal signal from the thermal sensor 20 and maintains the current and the target light output such that the operating temperature does not exceed a target temperature. The low light output indicator 22 receives a signal from the photodetector 16 when the actual light output remains below the target light output and produces a low light output signal.

The at least one LED 14 of the LED lamp 10 can be mounted on a circuit board 24. The circuit board 24 may be made in one piece or in sections joined by electrical bridge connectors. An insulative board is typical, but other circuit board types, e.g., metal core circuit boards, can alternatively be used. Although the circuit board 24 shown in FIG. 1 is a circular surface, the circuit board 24 may be any shape desired or required depending on the overall shape and design of the lamp 10.

The LEDs 14 can be mounted at predetermined intervals along or around the circuit board 24 to uniformly emit light from the lamp 10. The spacing between LEDs 14 along the circuit board 24 is a function of the surface area of the circuit board 24, the amount of light desired, the wattage of the LEDs 14, and the viewing angle of the LEDs 14. More than one LED is commonly referred to as a bank or array of LEDs. Within the scope of these, embodiments, one or more banks or arrays of LEDs can be mounted on one or more circuit boards. The LEDs can emit white light and, thus, are commonly referred to in the art as white LEDs. However, other types of LEDs can be utilized, for example, red and green LEDs.

The LEDs 14 utilized in the lamp 10 are those known in the art. The LEDs 14 can be, for example, surface-mounted LEDs, organic LEDs, or high-power surface-mount devices of a type available from Nichia. The LEDs 14 may have power ratings of 0.1 watts or more, or more specifically, power ratings of one watt or more. However, the power ratings are provided as examples and are not meant to be limiting. Other power ratings can be used as desired or required.

The lamp 10 also has a housing 26 consisting of a cover 28 and a base 30. It is contemplated that the housing 26 may be of any suitable shape required or desired for use with light fixtures. As a non-limiting example, the housing 26 may be a shroud open along its length. The housing 26 may have as many ends as necessary for a secure fit and the proper electrical connection.

The cover 28 may be made of any material known in the art to be used in the lighting industry, including but not limited to UV resistant plastic or glass. For example, the cover 28 can be made from polycarbonate, acrylic, glass or another light transmitting material. That is, the cover 28 can be transparent or translucent. A translucent cover 28 can be made from a composite, such as polycarbonate with particles of a light refracting material interspersed in the polycarbonate.

The LEDs 14 can be arranged on the circuit board 24 or another surface within the housing 26 to emit or shine through only one side of the cover 28, thus directing the light to a predetermined point of use, or arranged to emit light through more than one side of the cover 28.

The photodetector 16 of the LED lamp 10 with failure alerting system is shown in FIG. 1 located within the housing 26 and mounted on the circuit board 24. The photodetector 16 is located to provide an accurate indication of the actual light output of the at least one LED 14. The actual light output is typically measured in lux. The photodetector 16 can be, for example, a photo diode, a photo transistor, a photo cell or other device capable of outputting a signal with respect to the light level sensed.

The photodetector 16 is configured to detect the actual light output from at least one LED 14 and send a signal to the regulator 18 when the actual light output is below a target light output. For example, the photodetector 16 can send a signal when the LED provides lux implying less than 30 lumens, the target light output. The photodetector 16 can be a single detector detecting the actual light output of a single LED, a single detector detecting the actual light output of multiple LEDs, and more than one detector each detecting the actual light output from a different LED. The configurations are provided by way of example and not limitation and other configurations known to those skilled in the art may be used.

Figure 2:
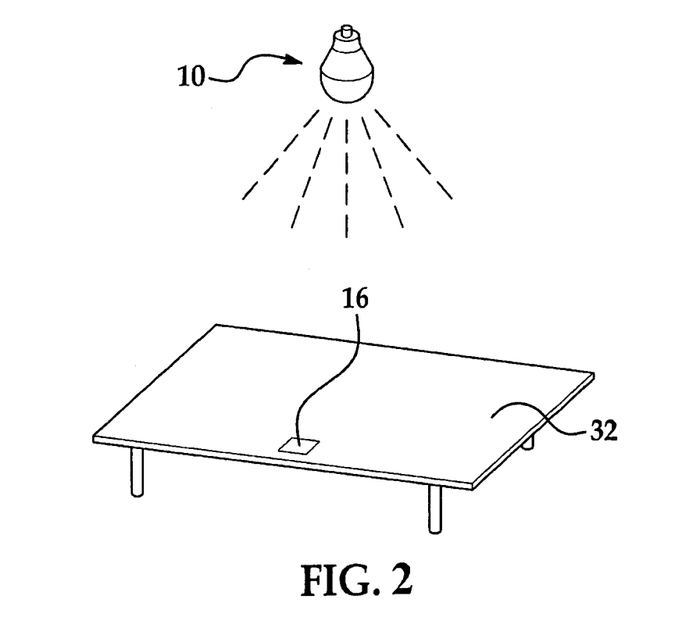
FIG. 2 is a schematic view of another embodiment of an LED lamp with failure alerting system disclosed herein.

In FIG. 1, the photodetector 16 is located within the housing 26 on the circuit board 24. Alternatively, the photodetector 16 can be located external to the LED lamp 10, as shown in FIG. 2. In FIG. 2, the photodetector 16 is embedded on a work surface 32. This location is provided by way of example and not limitation, and other locations can be used as desired or required by those skilled in the art. For example, the photodetector may be embedded in a floor, a hallway, or a stairwell.

The photodetector 16 sends a signal to the regulator 18 when the actual light output falls below the target light output. The signal can be sent electronically or wirelessly, depending on the desired or required location of the photodetector 16 in relation to the regulator 18. For example, with the configuration in FIG. 1, the photodetector 16 can transmit the signal to the regulator 18 electronically, whereas in FIG. 2, the transmission can be wirelessly.

The regulator 18 is configured to increase the current to the at least one LED 14 in response to the signal from the photodetector 16 so that the target light output is maintained. Alternatively, the regulator 18 may send current to a supplemental LED or a plurality of supplemental LEDs to generate the additional lumens. For example, in FIG. 1, LEDs 14a can be supplemental LEDs that are only provided current by the regulator 18 when the photodetector 16 sends a low light output signal. The regulator 18 can be a current regulator, a transistor and Zener diode, a Hall effect type current sensor, or other regulators known by those skilled in the art to regulate current.

It is contemplated that the regulator 18 may be outside of the lamp 10 and may control the light output and temperature of a plurality of lamps in series. For example, the regulator may monitor a plurality of lamps in an area and can increase current to those lamps when a low output signal is received. The regulator may monitor a plurality of lamps in an area and send current to another plurality of supplemental lamps in the same area when a low output signal is received.

The thermal sensor 20 of the LED lamp 10 with failure alerting system is shown in FIG. 1 located within the housing 26 and mounted on the circuit board 24. The thermal sensor 20 is located to provide an accurate indication of the operating temperature of the at least one LED 14. The thermal sensor 20 transmits a signal to the regulator 18 indicating the operating temperature to the regulator 18. The regulator 18 is programmed with a target temperature which the system is not to exceed. When the target temperature has been exceeded, the regulator 18 will reduce the current to the at least one LED 14 until the operating temperature drops below the target temperature. The target temperature overrides the low light output signal. In other words, even if the low light output signal is being transmitted to the regulator 18, if the signal from the thermal sensor 20 exceeds the target temperature, the regulator 18 addresses the thermal sensor signal rather than the low light output signal.

The location of the thermal sensor 20 on the circuit board 24 shown in FIG. 1 is provided by way of example and not limitation. It is contemplated that the thermal sensor 20 can be located on other surfaces with in the housing 26 of the lamp 10. Types of thermal sensors known by those skilled in the art can be used, including contact and non-contact sensors.

The lamp 100 can also include a heat sink (not shown) within the housing 26 to dissipate the heat generated by the at least one LED 14. Some of these heat sinks include projections for increasing the surface area of the heat sink. The heat sinks are typically formed by extruding billets of material, generally aluminum, through a die. The thermal sensor 20 protects the LEDs and so detects the temperature not withstanding the heat sink.

When the photodetector 16 detects low light for a predetermined period of time, the photodetector 16 sends a signal to the low light output indicator 22. When the signal from the photodetector 16 is received, the low light output indicator 22 produces a low light output signal. In other words, when the actual light output remains below the target light output because the regulator 18 can no longer maintain the target light output without exceeding the target temperature, a low light output signal is generated.

The low light output indicator 22 can generate a variety of signals indicating that the light output is low, depending on the indication desired of required. The following are provided as non-limiting examples.

The low light output signal can be an audible broadcast. For example, the audible broadcast can be an alarm, a beep, a series of sounds, or a verbal indication to change the bulb.

The low light output signal can be a visual signal. For example, the visual signal can be one or more LEDs within the lamp that are of a different color, the low light output indicator 22 turning on those one or more LEDs by providing current. The visual signal can be one or more LEDs that form a shape or word or words indicating the low output. The visual signal may be one or more flashing LEDs or a combination of flashing LEDs. The LEDs used to visually indicate low light output can be supplemental or can be the currently used LEDs. The visual signal can be a complete shutdown of the current such that the lamp provides no illumination to encourage replacement.

The low light output indicator 22 can be configured to transmit a wireless signal or broadcast to an external receiver. The external receiver can than provide an audible or visual indication of low light output. Other indicators can be used as desired or required and known to those skilled in the art.

The low light output indicator 22 may indicate the status of individual LEDs or a plurality of LEDs as a whole, such as a plurality of LEDs in one lamp. The low light level indicator 22 can be tied to a plurality of lights in a common area, wherein the low light output signal is only generated if the light output of the area is below a predetermined level.

Figure 3:
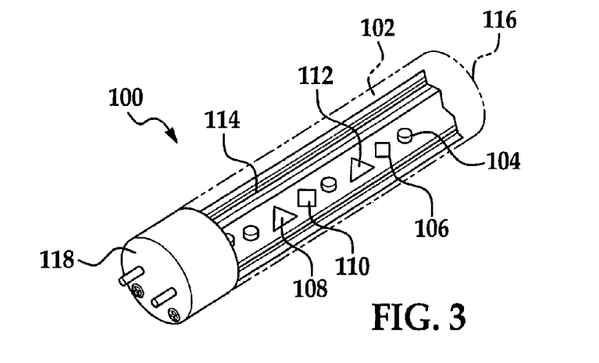
FIG. 3 is a perspective view of yet another embodiment of an LED lamp with failure alerting system disclosed herein.

FIG. 3 illustrates another embodiment of an LED lamp 100 with a failure alerting system. The lamp 100 is configured for use in an existing fluorescent fixture. The lamp 100 comprises an LED lighting unit 102 comprising at least one LED 104, a photodetector 106, a regulator 108, a thermal sensor 110, and a low light output indicator 112.

The embodiment illustrated in FIG. 3 operates in the same manner as the embodiments described in FIGS. 1 and 2. However, the lamp 100 of this embodiment is made to fit an existing fluorescent fixture, and so is formed in the same shape as a typical fluorescent tube with typical pin connections for cooperation with existing sockets. The illustrative shape of the housing 114 in FIG. 3 is tubular. While not illustrated to scale, the housing 114 can be approximately 48" long with a 0.625", 1.0", or 1.5" diameter for engagement with the typical fluorescent fixture.

The cover 116 can be made from polycarbonate, acrylic, glass or another light transmitting material that is transparent or translucent. For example, a translucent cover 116 can be made from a composite, such as polycarbonate with particles of a light refracting material interspersed in the polycarbonate. While the illustrated housing 114 is cylindrical, the housing 114 or cover 116 can alternatively have a square, triangular, polygonal, or other cross sectional shape. Similarly, while the illustrated housing 114 is linear, the housing 114 can have an alternative shape, e.g., a U-shape.

The at least one LED 104 is enclosed within the tubular housing 114 and mounted for emitting light through the cover 116. At least one electrical connector 118 at a longitudinal end of the tubular housing 114 is in electrical communication with the at least one LED 104. The number of LEDs 104 may vary such that the lamp 100 outputs the desired or required lumens, and the spacing between the LEDs 104 can also vary. The arrangement of LEDs 104 can be such as to substantially fill the entire space between ends of the housing 114.

The at least one LED 104, photodetector 106, regulator 108, thermal sensor 110, and low light output indicator 112 of the LED lighting unit 102 of FIG. 3 can operate in the same manner as described above with reference to FIGS. 1 and 2 and will therefore not be repeated.

Another embodiment disclosed herein is of a failure alerting system for use with LED lighting fixtures having at least one LED. The illustrative failure alerting system 200 shown in FIG. 4 comprises a photodetector 202 configured to detect an actual light output from the at least one LED, a regulator 204 configured to receive a signal from the photodetector 202 when the actual light output is below a target light output and to increase a current to the at least one LED to maintain the target light output, a thermal sensor 206 configured to sense an operating temperature of the at least one LED and to control the regulator 204 to increase the current and the target light output to ensure the operating temperature does not exceed a target temperature, and a low light output indicator 208 configured to receive a signal from the photodetector 202 when the actual light output remains below the target light output and to produce a low light output signal.

Figure 4:
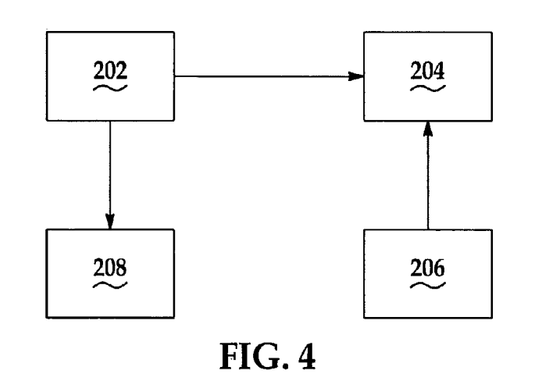
FIG. 4 is a schematic view of an embodiment of a failure alerting system for use with an LED lamp as disclosed herein.

The photodetector 202, regulator 204, thermal sensor 206 and low light output indicator 208 of the failure alerting system 200 shown in FIG. 4 are adaptable for use with existing LED lamps of any configuration. The failure alerting system 200 can be installed during manufacture or can be installed subsequent to manufacturing by a purchaser or installer. Once installed, the photodetector 202, regulator 204, thermal sensor 206 and low light output indicator 208 of the failure alerting system of FIG. 4 can operate in the same manner as described above with reference to FIGS. 1 and 2 and will therefore not be repeated.

Yet another embodiment of a failure alerting system for use with LED lighting fixtures having at least one LED is disclosed herein. The illustrative failure alerting system 300 shown in FIG. 5 comprises a photodetector 302 configured to detect an actual light output from the at least one LED, a regulator 304 configured to receive a signal from the photodetector 302 when the actual light output is below a target light output and to increase a current to the at least one LED to maintain the target light output, and a low light output indicator 306 configured to receive a signal from the photodetector 302 when the actual light output remains below the target light output and to produce a low light output signal.

Figure 5:
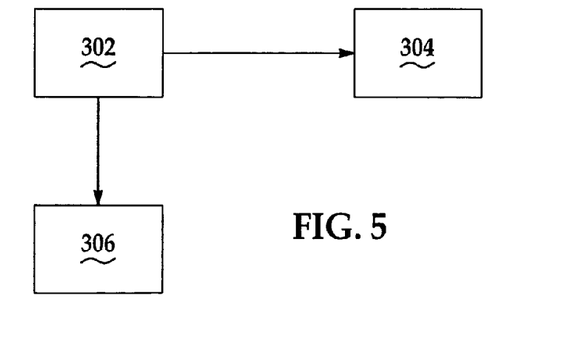
FIG. 5 is a schematic view of another embodiment of a failure alerting system for use with an LED lamp as disclosed herein.

The photodetector 302, regulator 304 and low light output indicator 306 of the failure alerting system 300 shown in FIG.

5 are adaptable for use with existing LED lamps of any configuration. The failure alerting system 300 can be installed during manufacture or can be installed subsequent to manufacturing by a purchaser or installer. Once installed, the photodetector 302, regulator 304 and low light output indicator 306 of the failure alerting system of FIG. 5 can operate in the same manner as described above with reference to FIGS. 1 and 2.

When the photodetector 302 detects low light for a predetermined period of time, the photodetector 302 sends a signal to the low light output indicator 306. When the signal from the photodetector 302 is received, the low light output indicator 306 produces a low light output signal. In other words, when the actual light output remains below the target light output because the regulator 18 can no longer maintain the target light output, a low light output signal is generated.

The low light output indicator 22 can generate a variety of signals indicating that the light output is low, depending on the indication desired or required. The examples provided above are equally applicable for this embodiment.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An LED lamp with failure alerting system comprising:
    a housing, the housing being at least partially transparent and comprising at least one LED and a circuit board within the housing;
    a connector located at an end of the housing, the connector connectable to an existing standard light fixture, wherein the housing and the connector at least partially define a single package sized for replacing a standard light in the fixture;
    at least one photodetector configured to detect an actual light output from the at least one LED;
    a regulator located within the housing and configured to:
        supply a substantially constant current to the at least one LED while allowing light output from the at least one LED to degrade over time towards a target minimum light output,
        receive a first signal from the at least one photodetector when the actual light output is below the target minimum light output, and
        increase current to the at least one LED to maintain the actual light output at the target minimum light output; and
    a low light output indicator carried by the housing and configured to receive a second signal from the at least one photodetector when the actual light output remains below the target minimum light output and to produce a low light output signal, wherein:
        the low light output signal is produced from within the housing, and
        the low light output signal is other than extinguishment of one or more of the at least one LED.

2. The LED lamp with failure alerting system of claim 1, wherein the low light output signal is a visual signal.

3. The LED lamp with failure alerting system of claim 2, wherein the visual signal is produced with the at least one LED.

4. The LED lamp with failure alerting system of claim 1, wherein the photodetector is located external to the housing on a surface that is illuminated by the LED lighting unit, the photodetector configured to wirelessly communicate with the LED lamp.

5. The LED lamp with failure alerting system of claim 1, wherein the at least one LED is a plurality of LEDs monitored by the at least one photodetector and at least one supplemental LED on standby, and wherein the regulator is further configured to provide current to the at least one supplemental LED only when the regulator receives a signal from the photodetector to increase current, the supplemental LED configured to produce an output which compensates for deficient output of the plurality of LEDs.

6. The LED lamp with failure alerting system of claim 1, further comprising a supplemental bank of LEDs on standby, wherein the regulator sends current to the supplemental bank to maintain the target minimum light output only when a low light output signal is sent to the regulator.

7. The LED lamp with failure alerting system of claim 1 further comprising:
    a thermal sensor located within the housing and configured to sense an operating temperature of the at least one LED, wherein the regulator is further configured to receive a thermal signal from the thermal sensor and prioritize the thermal signal above the first signal from the photosensor when the operating temperature exceeds a target temperature.

8. The LED lamp with failure alerting system of claim 1, wherein the at least one photodetector is a single photodetector located on the circuit board within the housing and the at least one LED is a plurality of LEDS, the single photodetector configured to detect total light output from the plurality of LEDS.

9. The LED lamp with failure alerting system of claim 1, wherein the at least one photodetector is a plurality of photodetectors each located on the circuit board within the housing and the at least one LED is a plurality of LEDS, one of each of the plurality of photodetectors configured to detect the actual light output from one of each of the plurality of LEDS.

10. The LED lamp with failure alerting system of claim 1, wherein the low light output signal includes light at a different color than light emitted from the at least one LED.

11. The LED lamp with failure alerting system of claim 1, wherein the low light output indicator includes an LED.

12. The LED lamp with failure system of claim 1, wherein the low light output indicator includes an LED configured to flash in response to the second signal to indicate a low light output level.

13. The LED lamp with failure system of claim 1, wherein the low light output indicator includes one or more LEDs arranged in a symbol for indicating a low light level, and wherein the one or more LEDs of the low light output indicator include the at least one LED, such that the symbol is formed using the light output from the at least one LED.

14. The LED lamp with failure system of claim 1, wherein the low light output signal is an audible broadcast.

15. An LED lighting fixture with an LED failure alerting system comprising:
    an elongate housing, the housing being at least partially transparent and having a circuit board carrying at least one LED;
    a connector located at an end of the housing, the connector connectable to an existing standard light fixture, wherein the housing and the connector at least partially define a single package sized for replacing a standard light in the fixture;

a photodetector located on the circuit board and configured to detect an actual light output from the at least one LED;

a regulator configured to:
supply a substantially constant current to the at least one LED while allowing light output from the at least one LED to degrade over time towards a target minimum light output, and receive a signal from the photodetector when the actual light output is below the target minimum light output and to increase a current to the at least one LED to maintain the actual light output at the target minimum light output;

a thermal sensor configured to sense an operating temperature of the at least one LED and to control the regulator to increase the current and the actual light output to ensure the operating temperature does not exceed a target temperature; and a low light output indicator configured to receive a signal from the photodetector when the actual light output remains below the target minimum light output and to produce a low light output signal including light at a different color than light emitted from the at least one LED.

16. The LED lighting fixture of claim 15, wherein the low light output signal is at least one of an audible broadcast and a visual signal.

17. The LED lighting fixture of claim 16, wherein the visual signal is produced with the at least one LED.

18. The LED lighting fixture of claim 15, wherein the low light output indicator is configured to transmit a wireless broadcast to an external receiver.

19. The LED lighting fixture of claim 15, wherein the photodetector is located on a surface external to the housing such that the photodetector is illuminated by the at least one LED, the photodetector configured to wirelessly communicate with the regulator.

20. The LED lighting fixture of claim 15, wherein the at least one photodetector is a single photodetector located on the circuit board within the housing and the at least one LED is a plurality of LEDS, the single photodetector configured to detect total light output from the plurality of LEDS.

21. The LED lighting fixture of claim 15, wherein the at least one photodetector is a plurality of photodetectors each located on the circuit board within the housing and the at least one LED is a plurality of LEDS, one of each of the plurality of photodetectors configured to detect the actual light output from one of each of the plurality of LEDS.

22. The LED lighting fixture of claim 15, wherein the low light indicator is located within the housing.

23. The LED lighting fixture of claim 15, wherein the low light output signal is displayed from within the housing.

24. The LED lighting fixture of claim 15, further comprising a supplemental bank of LEDs on standby, wherein regulator sends current to the supplemental bank to maintain the target minimum light output only when the low light output signal is sent to the regulator.

25. The LED lighting fixture of claim 24, wherein the low light indicator produces a visible signal indicating a low light level when the supplemental bank of LEDs cannot produce sufficient light to maintain the target minimum light output.

26. The LED lighting fixture of claim 15, wherein the low light output indicator includes one or more LEDs arranged in a symbol for indicating a low light level.

27. The LED lighting fixture of claim 26, wherein the one or more LEDs of the low light output indicator include the at least one LED, such that the symbol is formed using the light output from the at least one LED.

28. The LED lighting fixture of claim 15, wherein the low light output signal is an audible broadcast.

* * * * *